June 30, 1931.    G. P. BERRY    1,812,463
VACUUM BRAKE CONTROL ON PEDAL
Filed March 19, 1928
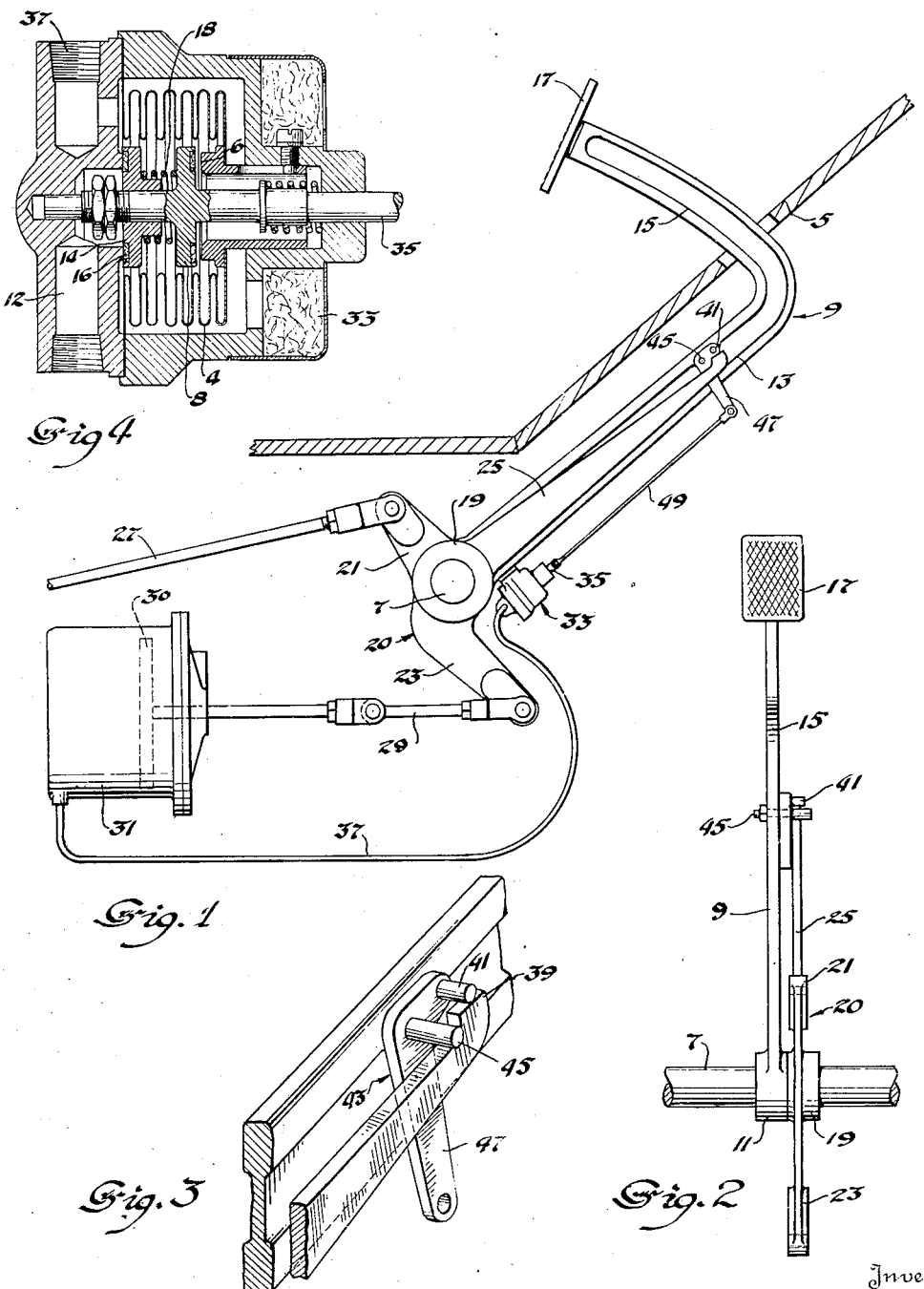
Inventor
George P. Berry
By Blackmore, Spencer & Hulse
Attorneys Patented June 30, 1931

1,812,463

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

VACUUM BRAKE CONTROL ON PEDAL

Application filed March 19, 1928. Serial No. 262,824.

This invention relates to a combined mechanical and power operating mechanism designed for use more especially in applying the brakes of motor vehicles. More specifically, the invention is concerned with the association with the brake pedal, as used on motor vehicles, of a power brake applying mechanism including a power cylinder operably connected to a brake and controlled by a valve, the valve having movable parts actuated by the pedal movement to open to the power cylinder a source of suction, preferably the suction of the intake manifold of the engine.

An object of the invention is to make an improvement in an organization of the above kind by utilizing a type of valve and by the adoption of a connecting mechanism between the pedal and the valve operating means, such that the auxiliary force exerted by the power cylinder may react through the valve upon the pedal pad and thus give to the operator a measure of the auxiliary force being exerted; but which may not react through the pedal and upon the control valve. A further object is to secure positive action by the elimination of all superfluous links used in valve actuation. As another object, the novel construction permits all the mechanism to be mounted beneath the floor boards. Other objects and advantages will be understood from a reading of the following description and an examination of the accompanying drawings.

In the drawings:

Figure 1 shows the novel operating mechanism in side elevation;

Figure 2 is a view of the same in end elevation;

Figure 3 shows a detail in perspective; and

Figure 4 is a section through the control valve.

Referring by reference characters to the drawings, numeral 5 is used to represent the floor boards of a motor vehicle. Beneath the floor boards is a fulcrum pin 7 about which rotates a pedal 9. The pedal is formed with a hub 11 and an arm 13 extending along the under side of the floor board, as shown, and it has an arm 15 extending through the floor, which arm has a rigid pedal pad represented by numeral 17.

By the side of the pedal there is rotatably mounted also on fulcrum pin 7 the hub 19 of a lever 20, which lever has three arms 21, 23 and 25. Arm 21 extends upwardly and to its end is connected rod 27 for attachment to a brake, or preferably to some member through which a plurality of brakes may be operated. This invention is in no way concerned with the mechanism operated by the rod 27 and no such mechanism, therefore, is illustrated. Arm 23 extends downwardly and is connected by an articulated link 29 to a piston 30 within a power cylinder 31. The operating stroke of the piston in the cylinder is to the left in Figure 1. This pulls rod 29, rotates lever 20 and pulls upon rod 27 in an obvious manner. Preferably secured to the pedal is a control device 33 in the form of a valve for controlling the pressure conditions within the cylinder 31. This control valve does not, per se, constitute a part of this invention. The valve is of known construction and includes a plunger rod 35. It also preferably includes a collapsible member such as a bellows 4 in constant communication with the power cylinder 31 by means of a conduit 37, the connection of 37 with the cylinder 31 being on that side of the piston remote from the connecting rod 29. The bellows is closed at times from the atmospheric air by an air valve constituted by a valve seat 6 carried by one end of the bellows, the valve seat being engaged by the air valve 8 rigidly carried by the plunger rod 35. The bellows is at times in communication with the engine manifold by a conduit 12, and a valve 14 mounted to slide on the plunger rod 35 and to engage valve seat 16 forming a part of the valve housing. Spring 18 normally holds valve 14 on its seat. When plunger 35 is drawn out, valve 8 engages its seat 6 and cuts off communication with the air. Further movement of the rod 35 expands the bellows, opens the suction valve 14 to the engine manifold with the result that the suction of the engine draws air from the left end of cylinder 31 through conduit 37, and through the expansible chamber of the control valve 33. This produces an unbalanced condition upon the opposite sides of the piston 30 in cylinder 31 and the consequent movement of piston 30 to the left. This movement through the links and lever 20 applies the brake. The reduced pressure within the power cylinder 31 is accompanied by a built-up suction in the bellows of the valve 33. The air pressure within the valve 33 but outside the bellows tends then to collapse the bellows and does so unless prevented by added pedal pressure which is exerting a pull on rod 35. If such collapsing of the bellows occurs, it closes the suction valve as will be obvious. Further movement of the plunger rod 35 will permit the opening of the air valve and the venting of cylinder 31. These operations are well-known with valves of this type and need not be further described since this invention is not concerned with the valve, per se, as stated above.

The arrangement for actuating the valve by the pedal movement is as follows. The long arm 25 of lever 20 extends substantially parallel with the arm 13 of the pedal and terminates in an end abutment 39 for engaging a pin 41 projecting from one arm of a bell crank lever 43. The pin 41 is on the short arm of the bell crank and this short arm extends in a direction parallel with the longitudinal axis of the pedal arm 13. The pivot 45 of the bell crank also projects sufficiently to be at times engaged by the arm 25 just below its end 39. The long arm 47 of the bell crank is connected by rod 49 with the plunger rod 35 of the valve.

The operation of the device takes place as follows. Normally, and with the foot removed from the pedal, the cylinder 31 is vented through the open air valve member of the control device 33 and the suction valve in the control device is closed. In operation of the brake, pressure is applied to the pedal. As the pedal is depressed, it carries with it bell crank lever 43. The pin 41 engages part 39 of the lever arm 25 and applies the brake mechanically by rotation of lever 20. At the same time, however, the bell crank rotates about its pivot 45. The pin 41 therefore has a movement of rotation about pivot pin 45 and also a bodily movement with the pedal as it turns about its fulcrum 7. The bodily movement is operating through arm 25 to apply the brake mechanically. The pivotal movement about pivot 45 is functioning to pull rod 49 and through that rod, to close the air valve in the control device 33 and open the suction valve. The opening of the suction valve affords free communication between the left end of cylinder 31 and the manifold of the engine. The manifold thereupon draws air from the left end of cylinder 31 through the conduits and the bellows constituting a part of the control device 33. The unbalanced pressure within cylinder 31 is then effective to apply the brake by means of the rotating lever 20. In so doing, the suction condition increases not only in the power cylinder, but also in the valve. The air entering the valve member and outside the collapsible chamber tends to gradually overcome and collapse the suction chamber and in doing so, pulls inwardly on rod 49. Since the brake is applied, the end of arm 25 may be considered as a fulcrum and the pull upon rod 49 tends to turn the bell crank about the point of contact between pin 41 and the end 39 of arm 25. This action, in obvious manner, tends to swing the pedal upwardly against the foot of the operator in a counterclockwise direction, the pressure of the pedal pad against the foot of the operator giving a "feel" as to the measure of the action of the suction brake. After the suction valve member of the control device 33 closes the brake remains applied, the pedal pressure maintaining the unbalanced condition within the valve and cylinder. A further pressure by the operator will supplement both the mechanical and power brake action and the increment of the latter will react on the pedal as before. When the pedal pressure is wholly released the cylinder is vented to the air and both brake applying mechanisms cease to operate in a manner which will be obvious.

By the arrangements shown and described not only are both the pedal and the plural arm lever pivoted together in a space which must be provided for any brake pedal; not only is the control valve located under the floor board, but also the whole reaction instrumentality is under the floor board and on the pedal. There results an exceedingly neat arrangement having no exposed parts to disfigure the appearance of the car. The power cylinder may, of course, be located in any convenient position, and the combined pedal and lever may be assembled in position with almost no more difficulty than in the case of mounting a conventional brake pedal.

After the power brake is in full action, additional mechanical brake action may be secured by further pressure on the pedal as a result of which the extension of pivot 45 engages the lever arm 25 and rotates lever 20. Should the power brake fail, the mechanical brake is operating precisely in the same way, through the contact of pivot pin 45 with the arm 25. The operator is advised of the failure of the power brake owing to the lack of any reaction from the suction valve upon the pedal.

The construction furthermore reduces to a minimum the number and cost of parts required. The operation is positive in that a minimum number of parts are associated with the control valve. All parts are inconspicuously mounted beneath the floor. The long arm 25 gives to the operator substantially the same leverage as is usual in the operation of the brake mechanically. The arms of the bell crank may be proportioned to predetermine a desired relation between the applied pedal pressure effective to actuate the valve and the force through which the valve reacts on the pedal.

I claim:

1. In a vacuum operated brake, a manually operable member, a power operated device, movable means through the instrumentality of which said power operated device is adapted to apply brakes, a control device for said power operated device, a lever movably mounted on said manually operable member and engaging said movable means, connecting means between said control device and said movably-mounted lever.

2. In combination, an operating lever to receive manually applied force, a power device, a lever through which said power device is operated, a control device for said power device and means associated with said levers whereby a portion of the manually applied force renders said control device operative upon said power device and through the instrumentality of which said control device reacts upon said operating lever in proportion to the force exerted by the power device, said control device being mounted upon said operating lever.

3. In combination, an operating lever to receive a manually applied force, a power device, a brake lever mounted coaxially with said operating lever, connection from said power device to one arm of said brake lever, brake operating means connected to another arm of said brake lever, a control device for said power device, and means associated with said levers whereby a portion of the manually applied force renders the control device operative upon the power device and through which means the control device reacts upon the operating lever, said control device being secured to said operating lever.

4. In combination, an operating lever to receive a manually applied force, an independently rotatable lever, a power device, a connection between said power device and said independently rotatable lever, a rod connected to said independently rotatable lever for transmitting the force applied to said lever by said power device, means affording a limited movement between said two levers, means for controlling said power device, said means being actuated by said relative movement of said levers upon the application of manual effort to said operating lever, said last named means including a third lever pivoted to said operating lever, means operatively connecting said independently rotatable lever with one arm of the third lever and a connection between said control device and another arm of said third lever, said control device being mounted on said operating lever.

5. In combination, an operating lever to receive a manually applied force, an independently rotatable lever, a power device, a connection between said power device and said independently rotatable lever, a rod connected to said last-named lever for transmitting the force applied to said lever by said power device, means affording a limited movement between said two levers, means for controlling said power device and actuated by the said relative movement of said levers upon the application of manual effort to said operating lever, said last named means including a third lever pivoted to said operating lever, means operatively connecting said independently rotatable lever and one arm of said third lever and a connection between said control device and another arm of said third lever.

6. In a combined manually operative and power operating device for vehicle brakes, a pedal, a coaxial lever, a power cylinder, a control valve therefor, a connection between the coaxial lever and the power cylinder, a rod pivoted to said coaxial lever for transmitting to brakes the force applied by the power cylinder to the coaxial lever, movable means affording a limited relative movement between said pedal and coaxial lever, said means operatively connected to said control valve, said control valve being mounted on said pedal.

7. In a combined manually operative and power operating device for vehicle brakes, a pedal, a coaxial lever, a power cylinder, a control valve therefor carried by said pedal, a connection between the coaxial lever and the power cylinder, a rod connected to said coaxial lever for transmitting to brakes the force applied by the power cylinder to the coaxial lever, movable means affording a limited relative movement between said pedal and coaxial lever, said means operatively connected to said control valve, said movable means including a third lever pivoted to said pedal, a link connection between said third lever and said control device, said coaxial lever having an arm operatively associated with one arm of the third lever.

8. In a combined manually operative and power operating device for vehicle brakes, a pedal, a coaxial lever, a power cylinder, a control valve therefor carried by said pedal, a connection between the coaxial lever and the said power cylinder, means whereby the said coaxial lever may transmit the force transmitted to it by the power cylinder, movable means affording a limited relative movement between the pedal and the coaxial lever, said movable means comprising a third lever pivoted to said pedal, said coaxial lever having an arm extending along the pedal and engaging one arm of said third lever whereby pedal pressure rotates said coaxial lever to apply the brake mechanically, means connecting said third lever and control valve whereby pedal pressure also operates the control device of the power cylinder.

9. In combination, a pedal, a coaxial lever, a power cylinder, a link connecting said power cylinder and coaxial lever, means associated with the lever for operating brakes or the like, a third double arm lever pivoted to said pedal said pivot being provided with an extension, said coaxial lever having a long arm extending substantially parallel with the pedal beneath the pivot extension and engaging an arm of the third lever beyond the pivot, a power cylinder control valve on the pedal, a connection between said control valve and a second arm of the third lever, whereby the pedal pressure normally operates to apply the brake through the instrumentality of said means and simultaneously operates to control the valve, and through the engagement of the long arm of the coaxial lever with the pivot extension of the third lever permits independent mechanical brake application in the event of failure of the power brake operating means.

10. In combination, a pedal, a three arm coaxially mounted lever, a power cylinder, a rod connecting said power cylinder to one arm of said coaxial lever, means connected to a second arm of said lever whereby the force applied to said lever by the power cylinder may be transmitted, a third arm of said coaxial lever extending along and substantially parallel with the pedal, a third lever on said pedal, one arm of said third lever having a projection engaging said third arm of the coaxial lever, a reaction follow-up valve on said pedal, a link connecting said valve and a second arm of the third lever, whereby the pedal pressure is divided, part of the pressure rotating the third lever and actuating the control valve, and whereby the force exerted by the power cylinder reacts through the third lever upon the pedal.

11. In a vacuum brake, a manually operable lever, a brake lever, a power device, operating means connected to said brake lever and power device, a third lever engaging an arm of said brake lever, a pivot for said third lever carried by said manually operable lever, said pivot limiting the movement of said brake lever in one direction, a control device having suction and exhaust valves and common means to operate said valves, a connection between said common means and said third lever.

In testimony whereof I affix my signature.

GEORGE P. BERRY.